Nov. 3, 1931.  E. H. CHANDONIA  1,830,191
MULTIPLE BAKING PAN STRUCTURE
Filed Dec. 26, 1929
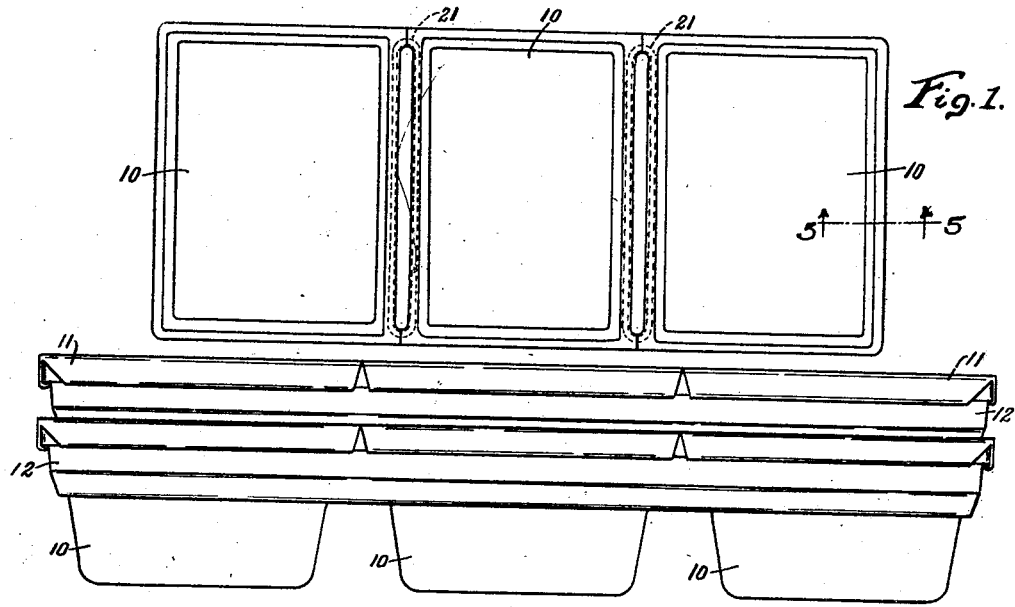
Fig. 1.
Fig. 2.
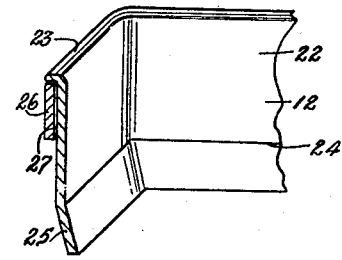
Fig. 3.    Fig. 4.
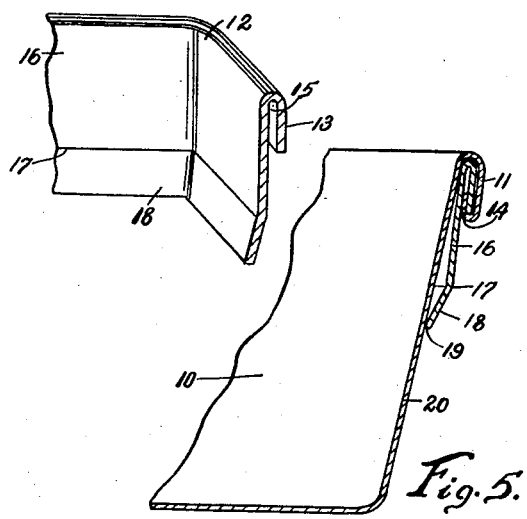
Fig. 5.
Inventor
Elmer H. Chandonia
By Murray and Burgelter
Attorneys Patented Nov. 3, 1931

1,830,191

UNITED STATES PATENT OFFICE

ELMER H. CHANDONIA, OF LUDLOW, KENTUCKY, ASSIGNOR TO THE LOCKWOOD MANUFACTURING COMPANY, OF CINCINNATI, OHIO, A CORPORATION OF OHIO

MULTIPLE BAKING PAN STRUCTURE

Application filed December 26, 1929. Serial No. 416,376.

An object of this invention is to provide a set or plurality of baking pans, or so called multiple baking pans, wherein the various desirable characteristics and features of advantage now present in various types of multiple baking pans may be retained, and in which there may be also attained certain other features that will obviate certain objectionable features in multiple baking pans as produced at this time.

In baking pans it is desirable to have absolutely smooth interior walls, wherefore the use of rivets and the like for attaching baking pans to suitable supporting frames is precluded. Accordingly, it is necessary to provide some positive fixing means, other than the rivets, for attaching a row or plurality of preferably seamless individual pans to a sustaining, supporting or attaching frame. It has been common to provide the individual pans with flanges along the free ends of the pan and to turn these flanges about the frame of the multiple pan. One of the difficulties encountered in this type of construction has been the fact that the sheet metal from which the individual pans are made, is capable of but a limited amount of drawing before the metal will break or tear. Accordingly, the portions of the frame about which such drawn flanges could be formed, had to be so narrow that they gave inadequate support to a multiple pan structure, and they could not be used as a spacing means between multiple pans when nested. It is desirable to have nested pans spaced to some extent so that they will cool as quickly as possible, thereby making it possible to re-use the multiple pans in a minimum period of time. This is particularly important in large bakeries where there is almost continuous baking going on, because unless the baking can be so handled that the pans will cool in a minimum period of time, it is necessary to provide a much larger supply or number of multiple pans than would otherwise be required, in order to effect the continuous baking of products. It has therefore been common to provide multiple baking pans with so-called spacer or nesting plates. These nesting plates entail additional work and expense and they are not satisfactory because they are difficult to attach, and because an effective attachment of a nesting plate requires contact of a nesting plate with the pans at one or more places. It is not uncommon for uneven baking of the products to result from the unequal masses of metal disposed at various places about the pan surface which causes unequal distribution of heat to the product being baked. An object of this invention is, as previously stated, to attain the advantages of a smooth pan, the nesting feature, and rigidity of mounting of the nesting means in a simple and economical manner without having the resultant structure subject to the attendant disadvantages of unequal masses of metal contacting the pans in such wise as would effect unequal baking of the parts of the product.

These and other objects are attained by the means described herein and disclosed in the accompanying drawings, in which:

Fig. 1 is a plan view of a plurality of nested multiple pans embodying the invention.

Fig. 2 is an elevational view of the device as shown in Fig. 1, parts being broken away.

Fig. 3 is a fragmental view of one form of frame member forming a detail of the invention.

Fig. 4 is a fragmental view of a modified form of frame member.

Fig. 5 is an enlarged sectional view on line 5—5 of Fig. 1.

The individual pans 10 may be formed as they are commonly made and have flanges 11 formed along the upper extending walls. The flanges 11 are preferably made as long as possible without tearing or fracturing the metal. Although three pans are shown as comprising the multiple pan structure, it is to be understood that the number thereof may be varied.

A frame 12 is provided and is of such size that the requisite number of pans 10 may be introduced into the frame. The frame preferably comprises a single metal strip of considerable width, the upper end 15 of which is turned or bent for providing the flange indicated at 13. The flange 13 is made of a width such that the flanges 11 formed on the walls of the pan may be turned around the flange 13 and may have their free ends 14 introduced into the channel 13 provided between the flange 13 and the body 16 of the frame strap 12. The frame strap 12 is provided along its lower edge with a corrugation 17 which sets off a flange 18 from the body 16 thereof. The lower inner edge 19 of the flange 18 is adapted to contact upon the outer face 20 of the pan. The said contact is practically a line contact, wherefore there would be no such mass of material along that line contact as would have any effect upon the uniform and even baking of the bread. The corrugation provided in the frame serves both to strengthen the frame and to give certain resiliency thereto as a result of which the frame functions as a shock absorber for the multiple unit of pans. The free ends 14 of the flanges 11 formed on the pans, are clamped between the flange 13 and the body 16 by the die that turns the flange 11 about the frame 12 and which also turns the ends 14 into the channel 15, thereby providing a rigid mounting of the frame 12 upon the pans or vice versa. It should be noted that the body 16 of the frame 12, because of the corrugations 17, recedes or diverges downwardly in relation to the pan wall 20, wherefore there is substantially no portion of the frame in such contact with the wall 20 of the pan as would in any way affect the uniform baking of the substance within the pan.

Adjacent pans may have their flanges such as 11 curled about a suitable elongated, endless metal bar 21 in a manner that is commonly employed in this art.

The frame 12 disclosed in Fig. 4 comprises a body portion 22, having a peripheral flange 23 at its upper end, a corrugation 24 similar to the corrugation 17 and a bottom flange 25 similar to the flange 18. Instead of having a flange integral as is the flange 13, a suitable bar 26 may be so positioned in relation to the body 22 and flange 23, that the flanges 11 on the pan, may be formed about the bar 26 and so that the free ends 15 of the flanges 11 may be introduced into the channel 27 between the body 22 and the bar 26. The frame 12 shown in Fig. 4 and its associated parts, cooperates with the pans in the same manner in which the frame 12 shown in Fig. 3 cooperates with the pans.

For all practical purposes, the strip or strap 12 may be considered as a continuous member, notwithstanding that in some instances it might be desirable to provide a multiplicity of strips that together encompass a set or row of baking pans. In any form, the strips function as a support for the enclosed pans when resting or nesting on a like set of pans, thereby attaining a nesting of desired depth and a separation of the pans for quick cooling.

The relationship of the strip or strap body and the depending flange 18 is such that together they assume an outwardly bowed form or shape relative the outer faces or exposed walls of the pans, having substantially parallel line contacts on the pans along its upper and lower edges only, thereby providing sufficient space for ventilation between the pan walls and strap, and at the same time providing a fixed relationship of the pans and strap that is however, not devoid of such resiliency as may be desirable to assure maximum service from such structure with a minimum of distortion and damage to the structure as a result of the rough handling and repeated heating and cooling to which the structures are subjected.

What is claimed is:

1. A set of baking pans enclosed within a single continuous frame strap provided at its upper edge with a flange about which the end walls of each pan are turned and securely clamped, and at its lower edge with an angle flange extending entirely across and in line contact with outer walls of the pans.

2. The combination with a row of spaced seamless pans provided with flanges at their upper ends along their adjacent walls and along their outwardly exposed walls, and means for joining the flanges of the adjacent walls of the row of pans, and a strap extending in substantial continuity about the row of pans and along the said outwardly exposed walls thereof, the strap comprising a body portion and a relatively narrow clamping member along the upper edge of the body portion and about which clamping member the flanges of the outwardly exposed walls are formed and between which clamping member and body portion the edges of said flanges are retained, the body portion being wide relative the clamping member, the body portion having a depending flange extending at an angle to it and to the exposed pan walls, and having a line contact along its lower edge with the pans, whereby to space the body portion and depending flange from the pans except for substantially parallel line contacts of the depending flange and the upper edge of the body portion upon the exposed pan walls.

3. The combination with a row of spaced pans provided with flanges at their upper ends along their adjacent walls and along their outwardly exposed walls, and means for joining the flanges of the adjacent walls of the row of pans, and a strap extending in substantial continuity about the row of pans and along the said outwardly exposed walls thereof, the strap comprising a body portion and a relatively narrow clamping member along the upper edge of the body portion and about which clamping member the flanges of the outwardly exposed walls are formed and between which clamping member and body portion the edges of said flanges are retained, the body portion being wide relative the clamping member, the body portion having a depending flange extending at an angle to it and to the exposed pan walls, and having a line contact along its lower edge with the pans, whereby to space the body portion and depending flange from the pans except for substantially parallel line contacts of the depending flange and the upper edge of the body portion upon the exposed pan walls.

4. As a new article of manufacture a bake pan unit comprising pans having corresponding walls disposed substantially in a common plane and flanges on the walls, a binding strap and nesting spacer comprising a body portion and a relatively narrow flange clamping means along the upper edge thereof, the clamping means consisting of a turned over portion parallel to and spaced from the body portion, and a depending longitudinal flange disposed at an angle to the body portion and adapted to make a line contact upon all of the corresponding pan walls and to rest upon the tops of grouped pans when nested.

In testimony whereof, I have hereunto subscribed my name this 19th day of December, 1929.

ELMER H. CHANDONIA.